J. GLIDDEN.
CULTIVATOR.

No. 178,846.  Patented June 20, 1876.

Witnesses.

Joseph Glidden,
by his attorney.

UNITED STATES PATENT OFFICE.

JOSEPH GLIDDEN, OF LIBERTY, MAINE.

IMPROVEMENT IN CULTIVATORS.

Specification forming part of Letters Patent No. 178,846, dated June 20, 1876; application filed February 7, 1876.

*To all whom it may concern:*

Be it known that I, JOSEPH GLIDDEN, of Liberty, of the county of Waldo and State of Maine, have invented a new and useful Improvement in Cultivators; and do hereby declare the same to be fully described in the following specification and represented in the accompanying drawings, of which—

Figure 1:
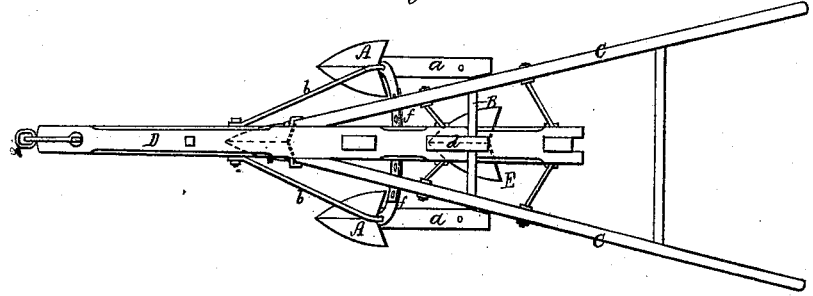
Figure 2:
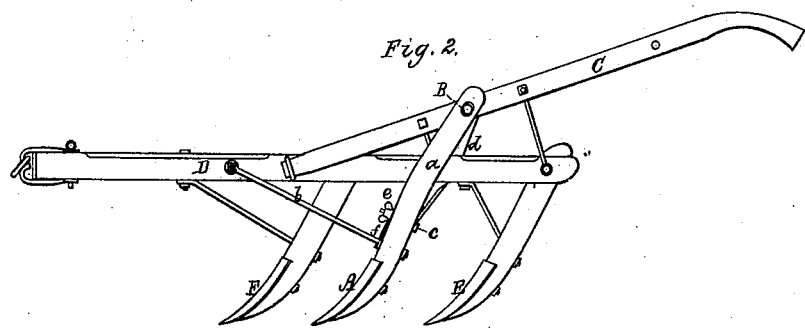
Figure 3:
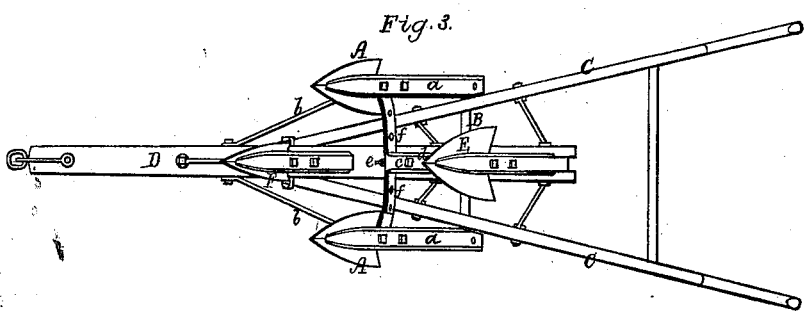
Figure 4:
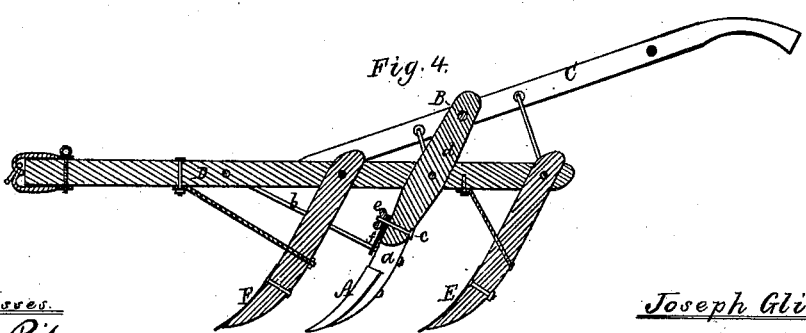

Figure 1 is a top view, Fig. 2 a side elevation, Fig. 3 an under-side view, and Fig. 4 a longitudinal section, of a cultivator provided with my invention.

It (the said invention) relates to a cultivator having lateral spades, adjustable to different distances asunder; and it consists in the means of applying and supporting such spades with reference to the main beam and its handles.

Heretofore, I believe, it has been customary to fix the shanks of the lateral spades to bars provided at their front ends to the main beam near its front end.

I dispense with such bars, and in my cultivator I pivot the shanks $a\ a$ of the lateral spades A A directly to the ends of a rock-shaft, B, going through the handle-bars C C, that project from the main bar D, to which I fix two other spades, E F, one in advance and the other in rear of the pair of lateral spades A A; and, furthermore, I provide each of the said stocks $a$ with a support-rod, $b$, extended from it to the main beam, and so loosely connected to the two as to readily admit of the adjustment of the lateral spades nearer to or farther from each other, as occasion may require. I also provide the lateral spades with curved perforated support-braces $f\ f$, extended from the rods $b\ b$, in manner as shown. These braces lap on one another, and receive a bolt, $c$, that goes through them, and a support-piece, $d$, extending down from the main beam, as shown. A nut, $e$, is screwed on the bolt, and with it serves to hold the braces in connection with each other and the support-piece.

The toe-spade F I make narrower than, or about one-half the width of, the heel-spade E, in order that the furrow made by such toe-spade may be enlarged by the heel-spade while the cultivator may be in use.

From the above it will be seen that each lateral spade, while being swung laterally, can move a little, either forward or backward, to accommodate itself to its support-rod, which, as the lateral spade is moved outwardly, will draw it forward a little, the rock-shaft turning a little to admit such forward movement to take place.

I claim—

The described improved cultivator, composed of the handles C, bar D, support-piece $d$, heel and toe spades E F, differing in widths, as described, and the lateral adjustable spades A A, having their stocks pivoted to a rock-shaft, B, and furnished with support-rods $b\ b$ and perforated curved braces $f\ f$, all being arranged and applied substantially as specified.

JOSEPH GLIDDEN.

Witnesses:
J. W. KNOWLTON,
JULIA KNOWLTON.